Patented July 14, 1925.

1,545,927

UNITED STATES PATENT OFFICE.

CLARENCE I. ROBINSON, OF STATEN ISLAND, NEW YORK, ASSIGNOR TO STANDARD DEVELOPMENT COMPANY, A CORPORATION OF DELAWARE.

DENATURED ALCOHOL.

No Drawing.     Application filed March 5, 1921.  Serial No. 449,896.

*To all whom it may concern:*

Be it known that I, CLARENCE I. ROBINSON, a citizen of the United States, residing at 708 Jewett Avenue, Staten Island, in the county of Richmond and State of New York, have invented a new and useful Improvement in Denatured Alcohol, of which the following is a specification.

In accordance with the present invention a denatured alcohol is prepared containing as a denaturant a dilute-acid insoluble product formed during the treatment of olefine-containing hydrocarbon gases with sulfuric acid of a sulfating strength. When such gases, for example, the gases resulting from the cracking or pressure distillation of hydrocarbon oils, are caused to contact at a controlled temperature, preferably below 30° C., with sulfuric acid of a sulfating strength, i. e., corresponding to a density above 1.75 and below 1.84, preferably about 1.8, an acid extract is formed which contains the acid sulfates of the olefines of the gases higher than ethylene with a product which, on dilution, separates out as an oily layer. This product is a complex mixture containing polymerized unsaturated hydrocarbons, sulfur compounds, etc. It is dark brown to black in color, has a density of 0.85 to 0.90, and is readily miscible with strong alcohol and kerosene. It begins to boil at about 63° C. and its boiling point rises gradually as evaporation continues to the formation of a pitchy or coke-like product. When added to alcohol it cannot be completely separated therefrom by fractional distillation.

If desired, the product may be subjected to distillation, and a distillate having a suitable range of boiling points, say 63 to 250° C. employed as a denaturant. This distillate has a brownish color, a sulfurous odor, and a density of about 0.84 to 0.85 and an analysis shows from 10 to 15% of sulfur.

Either the undistilled or distilled product may be added to alcohol in any desired proportion, and may, if desired, be previously admixed with kerosene or benzol. For example, one part of the product may be admixed with three parts of kerosene, and used as a denaturant in the proportion of 2 to 3 gallons of the mixture to 100 gallons of ethyl alcohol (190 proof).

I claim:

1. A denatured alcohol comprising alcohol and dilute acid-insoluble products resulting from the treatment of olefine-containing hydrocarbon gases with sulfuric acid of a sulfating strength.

2. A denatured alcohol comprising alcohol, dilute acid-insoluble products resulting from the treatment of olefine-containing hydrocarbon gases with sulfuric acid of a sulfating strength and kerosene.

3. As a denaturant for alcohol, a distillate of dilute acid insoluble-products resulting from the treatment of olefine-containing hydrocarbon gases with sulfuric acid of a sulfating strength having a dry point of about 250° C.

4. As a denaturant for alcohol, dilute acid-insoluble products resulting from treatment of olefine-containing hydrocarbon gases with sulfuric acid of a sulfating strength and kerosene.

5. As a denaturant for alcohol, dilute acid-insoluble products resulting from the treatment of olefine-containing hydrocarbon gases with sulfuric acid of a sulfating strength and kerosene in the proportions of 1 to 3.

CLARENCE I. ROBINSON.